3,480,646
ORTHOCARBOXY - SULFO - DODECACHLORO-
OCTAHYDRODIMETHANOTRIPHENYLENE
ANHYDRIDE
Melvin Look, El Cerrito, Weldon M. Padgett II, Berkeley, Julius Hyman, Piedmont, Joseph G. E. Fenyes, Berkeley, and Herbert P. C. Lee, Albany, Calif., assignors to Fundamental Research Company, Berkeley, Calif., a partnership
No Drawing. Original application May 3, 1962, Ser. No. 192,285. Divided and this application July 27, 1965, Ser. No. 484,503
Int. Cl. C07d 89/00; C07c 143/38, 65/16
U.S. Cl. 260—327　1 Claim

ABSTRACT OF THE DISCLOSURE

Di-substituted Diels-Alder adducts of two molecules of hexachlorocyclopentadiene and one molecule of napthalene, e.g. 2-methyl-3-sulfonic acid-DHA, useful as intermediates, e.g. for the preparation of BON acid.

---

This is a division of copending application, Ser. No. 192,285, filed May 3, 1962, for preparation of "BON acid." Application Ser. No. 192,285 is now abandoned. Application Ser. No. 192,285 was a continuation-in-part of co-pending application Ser. No. 143,049, filed Oct. 5, 1961, now Patent No. 3,177,246, issued on Apr. 6, 1965.

This invention relates to naphthalene chemistry. It is directed particularly to a new and improved method for the preparation of 3-hydroxy-2-napthoic acid, also called beta-oxynaphthoic acid and BON acid; and to certain novel naphthalene derivatives formed in the course of that preparation.

Since its introduction as an intermediate about 1910, 3-hydroxy-2-naphthoic acid, hereinafter referred to for convenience in this specification as BON acid, has been one of the most widely used naphthalene derivatives in the preparation of azoic dyestuffs. It has always been prepared commercially by the Kolbe-Schmitt synthesis, which involves the treatment of an anhydrous salt of beta-naphthol with dry carbon dioxide at elevated temperature and pressure. The quality of the BON acid thus produced is generally good, but the yield of product based on charge is low, and the process is both time-consuming and not easily controlled to give uniform yields and product. Nevertheless, some three million pounds of BON acid are being produced annually in the United States by this process.

The present invention provides an entirely new and improved approach to the preparation of BON acid. It is based on our discovery that the Diels-Alder adduct of two molecules of hexachlorocyclopentadiene and one molecule of 2-methylnaphthalene may be treated with certain reagents to introduce into the 3-position of the naphthalene moiety a substituent group which is eventually replaced by an hydroxyl group; that at some stage in the process the substituted diadduct may be pyrolytically cracked to produce the correspondingly substituted naphthalene with regeneration of the hexachlorocyclopentadiene; and that at one of several stages in the process (also, in fact, even prior to the intorduction of the substituent group into the 3-position), the methyl group in the 2-position may be oxidized to a carboxyl group. The product of these several reactions, carried out in different sequences, when finally separated and recovered, is BON acid of high purity.

A principal object of the invention is therefore a new and improved process for preparing BON acid.

Another object of the invention is a process for introducing into the 3-position of the naphthalene moiety of the Diels-Alder adduct of two molecules of hexachlorocyclopentadiene and one molecule of 2-methylnaphthalene a substituent group which may eventually be replaced by an hydroxyl group.

A further object of the invention is the substituted diadduct of hexachlorocyclopentadiene and 2-methylnaphthalene containing in the 2-position of the naphthalene moiety a methyl or carboxy group and in the 3-position a substituent group which may be replaced by an hydroxyl group.

Still another object of the invention is the preparation of new and useful di-substituted derivatives of naphthalene and of the Diels-Alder adduct of 2 molecules of hexachlorocyclopentadiene and 1 molecule of 2-methylnaphthalene.

The manner of attainment of these and other objects of the invention will become apparent on the further reading of this specification and the claims.

The co-pending application of Melvin Look, Ser. No. 143,049, filed Oct. 5, 1961, discloses the Diels-Alder adduction of two molecules of hexachlorocyclopentadiene and one molecule of 2-methylnaphthalene and the preparation of certain substituted naphthalenes by appropriate processing of the di adduct. The preparation of such substituted naphthalenes has recently become of considerable potential commercial importance because of the availability of large quantities of 2-methylnaphthalene of high quality and low price as a by-product in the manufacture of naphthalene from petroleum.

The Diels-Alder adduct of hexachlorocyclopentadiene and 2-methylnaphthalene disclosed in the aforementioned application of Look, and which will be referred to for convenience hereinafter as "MDHA" (i.e., methyl di-hex adduct) or as "2-Methyl-DHA," has the empirical formula $C_{21}H_{10}Cl_{12}$ and the structural formula:

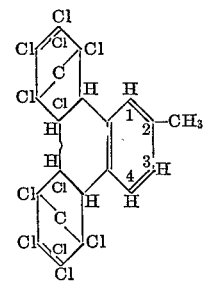

As previously noted, the process of the present invention comprises essentially the following steps, which may be carried out in one of several possible sequences: (1) Introduction of a substituent group into the 3-position of the naphthalene moiety of the MDHA; (2) pyrolytic cracking of the 3-substituted MDHA to yield a 2,3-substituted naphthalene with regeneration of hexachlorocyclopentadiene; (3) oxidation of the methyl group in the 2-position of the naphthalene or the naphthalene moiety of the diadduct to a carboxyl group or its anhydride; (4) replacement in one or more chemical steps of the substituent group in the 3-position of the naphthalene or the naphthalene moiety of the MDHA by an hydroxyl; and, finally, whatever the order of the previous steps, (5) separation and recovery of the BON acid. The last step listed includes, where involved and desired, the liberation of free BON acid from its salts.

We have found that the substituent group introduced at the 3-position of the naphthalene moiety of the MDHA is preferably a nitro, sulfo, or halo group. The sulfo group, as this term is used in this specification, may be either a sulfonic acid, sulfonic anhydride or sulfonyl chloride group, and the halo group may be chlorine, bromine or iodine. The nitro group may be converted to an hydroxy group by reduction to the amino group followed by diazotization and boiling or by a "reverse Bucherer" reaction (when applied to the substituted naphthalene); or, more directly, the nitro group may be replaced with an hydroxy or alkoxy group by treatment with a strongly alkaline reagent. The sulfo group may be replaced by an hydroxy group through caustic treatment, a method which is also effective in replacing halo groups.

The methyl group in the 2-position of the substituted naphthalene or naphthalene moiety of the MDHA may be economically oxidized to the carboxy group by air or oxygen, applied in the presence or absence of such oxidation catalysts as cobalt or manganese salts or soaps or hydrogen bromide. Alternatively, the oxidation may be effected by treatment with other known oxidizing agents, such as nitric acid, either concentrated or dilute, chromic acid, or permanganate, as hereinafter illustrated.

We have found that pyrolysis of the 2-methyl-3-sulfonic acid DHA usually results in considerable decomposition and poor recovery, and that this may be avoided by having sulfonyl chloride as the sulfo group in the 3-position, or condensing the sulfo group with the carboxy group in the 2-position (formed by oxidation of the methyl group prior to pyrolysis) to form a heterocyclic mixed sulfonic-carboxylic anhydride which will volatilize as the corresponding naphthalene when the diadduct is pyrolyzed. This naphthalene mixed anhydride has the ring structure:

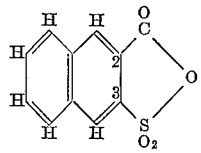

As previously indicated, we have found that there is considerable latitude in determining the sequence of the process steps listed above. In fact, it is possible to carry out these general steps in any desired sequence except that obviously for the purpose of the present invention the pyrolytic cracking step will not be performed prior to the introduction of the substituent group in the 3-position, nor can replacement of the substituent group in the 3-position be effected before the introduction of that group. Thus, for example, the methyl group in the 2-position may be oxidized to the carboxyl group before or after the introduction of the substituent group into the 3-position and subsequent processing; introduction of the substituent group into the 3-position may be accomplished before or after oxidation of the methyl group in the 2-position, as just noted; and replacement of the substituent group in the 3-position may be effected either before or after the pyrolytic cracking step.

Several preferred methods of accomplishing the process steps listed above, and several sequences in carrying them out which we have found desirable in practice are described for purposes of illustration, but not of limitation, in the examples given below. The MDHA used as the starting material was prepared according to the procedure set forth in Example I of the Look application, Ser. No. 143,049, previously referred to. In the process as given in that example, "a solution of 16.4 grams of hexachlorocyclopentadiene and 2.8 grams of 2-methylnaphthalene was heated at 150° to 155° C. for 7 days. At the end of that time the unreacted hexachlorocyclopentadiene and 2-methylnaphthalene were removed by vacuum distillation. The residue solidified on cooling to give 4.2 grams of the adduct composed of two moles of hexachlorocyclopentadiene with one mole of 2-methylnaphthalene. The product was purified by recrystallization first from hexane and then from methanol." The thus-purified product was employed in the examples given below.

Oxidation of 2-methyl group

There is considerable choice of oxidizing agents which may be used for this purpose, as previously indicated.

Examples I to V inclusive will describe typical oxidations we have carried out (1) before substitution in the 3-position, (2) after such substitution, and (3) after pyrolytic cracking.

EXAMPLE I

Oxidation of 2-methyl group before substitution

A mixture of 100 grams of MDHA with 500 grams of glacial acetic acid was stirred vigorously in a 1-liter, 3-neck flask, then boiled under reflux as 35 grams of chromic anhydride was added over a period of 30 minutes. The resultant mixture was refluxed at a temperature of about 120° C. for 18 hours, then cooled to room temperature and filtered. The filtered-off solids were washed first with acetic acid, then with water, and finally dried, to yield 68 grams of pure carboxy-DHA, having the empirical formula $C_{21}H_8Cl_{12}O_2$ and the structural formula:

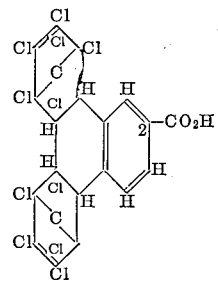

On diluting the first filtrate with water, a considerable amount of precipitate was formed. This was filtered off, washed and dried as before, and yielded an additional 22 grams of carboxy-DHA. The identity of the product in both cases was established by infra-red spectroscopy. The total yield was about 87 percent of the theoretical.

EXAMPLE II

Oxidation of 2-methyl group before substitution

A suspension of 50 grams of MDHA in 350 grams of concentrated (70%) nitric acid was boiled under reflux at a temperature of about 120° C. for 18 hours. During this period most of the MDHA apparently did not go into solution but remained suspended in the nitric acid. At the end of the reflux period the reaction was cooled to room temperature and then filtered to separate undissolved solids from the acidic solution. The filtered-off solids were washed with water and then dried. The dry product was examined by infra-red spectroscopy and found to be substantially pure carboxy-DHA, with a negligible amount of MDHA remaining and with evidence of a very small amount of a nitrated impurity. The dried solids weighed 50.0 grams, corresponding to about 96 percent of the theoretical.

EXAMPLE III

Oxidation of 2-methyl group after substitution

To 100 grams of concentrated (70%) nitric acid was added 10.0 grams of dry MDHA-sulfonic acid (i.e., with a methyl group in the 2-position and a sulfonic acid group in the 3-position) prepared according to the procedure hereinafter desscribed in Example VI. The mixture was heated to reflux temperature (about 120° C.) and maintained at that temperature for 8 hours with constant stirring. At the end of the reflux period the reaction mixture was cooled to room temperature and filtered. The filtered-off solids were washed with water and dried. The weight of dry product was 9.5 grams of pure 2-carboxy-DHA-3-sulfonic acid, the identity of which was established by infra-red spectroscopy. This weight was equivalent to a yield of about 91 percent of the theoretical.

EXAMPLE IV

Oxidation of 2-methyl group after substitution

In a 1-liter, 3-neck flask equipped with thermometer, stirrer and reflux condenser were placed 100 grams of MDHA-sulfonyl-chloride (i.e., with a methyl group in the 2-position and a sulfonyl chloride group in the 3-position) prepared according to the procedure hereinafter described in Example IX, 60 grams of potassium permanganate, 80 grams of sodium hydroxide, and 750 grams of water. The mixture was stirred and refluxed at about 100° C. for 18 hours. The reaction mixture was then cooled to room temperature and filtered. The filtered-off solids were suspended in water and the manganese dioxide removed by treatment with sodium bisulfite and hydrochloric acid, followed by boiling. The resultant clear solution with suspended solids was filtered, and the separated solids washed with water and dried. The dried product was shown by infra-red spectrophotometry to be pure 2-carboxy-DHA-3-sulfonic acid; it weighed 78.6 grams, corresponding to about 97 percent of the theoretical.

EXAMPLE V

Oxidation of 2-methyl group after pyrolytic cracking

To a solution of 7.3 grams of 2-methyl-3-naphthalene sulfonic acid in 250 ml. of water was added 1.25 grams of hydrogen bromide. The solution was charged to a glass-lined stainless steel autoclave, and oxygen gas was introduced to pressure the reaction vessel to 1,000 p.s.i.g. The contents of the autoclave were then heated to 175° C., at which temperature the pressure had risen to about 1,600 p.s.i.g. After 8¼ hours at this temperature, the autoclave was allowed to cool to room temperature, the pressure released, and the reaction mixture removed. The mixture was boiled, filtered hot to remove foreign matter, and evaporated to about half its original volume. Barium chloride was then added carefully to precipitate the barium salt, which was washed with water and dried. The weight of dried product was 10.6 grams, corresponding closely to quantitative conversion of the 2-methyl-3-naphthalene sulfonic acid starting material to 2-carboxy-3-naphthalene sulfonic acid, the identity of which was confirmed by infra-red spectroscopy. If desired, the free 2 - carboxy - 3 - naphthalene sulfonic acid could be prepared, of course, from the barium salt by treating an aqueous suspension of the latter with a stoichiometric amount of sulfuric acid, filtering off the resultant barium sulfate, and evaporating the filtrate to dryness.

Introduction of a substituent group into the 3-position

As previously indicated, the substituent group in the 3-position which is to be replaced eventually by an hydroxy group may be introduced either before or after oxidation of the 2-methyl group, but in the process of the present invention it is introduced prior to the pyrolytic cracking step. Generally speaking, however, we have usually found it preferable to accomplish the substitution prior to oxidation of the 2-methyl group to the carboxy group, since the latter group tends to have a de-activating effect on the benzenoid ring which makes necessary the use of somewhat more drastic reaction conditions for the substitution with the greater likelihood of the formation of undesired isomers. The substituent groups we have found particularly satisfactory for the purpose are the nitro, sulfonic acid, sulfonyl chloride and halo groups. While all halo groups aside from fluoro may be employed, we prefer the bromine and iodine groups, since we have found that better yields and higher purity of the desired product are obtained with these substituent groups than with chlorine. Examples VI to XV inclusive given below for purposes of illustration, but not of limitation, describe typical procedures we have employed for introducing the substituents listed.

EXAMPLE VI

Introduction of—SO₃H group (a) Using liquid sulfur trioxide.—To 190 grams "Sulfan," a stabilized liquid sulfur trioxide produced by the General Chemical Company, was added with stirring 50.0 grams MDHA. The reaction mixture was kept at a temperature of about 25° C. (liquid $SO_3$ freezes at 18° C. and boils at 45° C.) for 30 minutes and was then added carefully to an excess of ice. The resultant light-colored suspension was filtered. The filtered-off solids were washed with water and dried. Infra-red spectroscopic examination showed the product to be substantially pure MDHA-sulfonic acid, with the—SO₃H group in the 3-position. The weight of dried product was 52.5 grams, corresponding to about 94 percent of the theoretical yield.

EXAMPLE VII

Introduction of—SO₃H group (b) Using chlorosulfonic acid.—A solution of 172 grams (0.25 mole) MDHA in 625 grams of dry ethylenedichloride (1,2-dichloroethane) was placed in a 3-neck, 2-liter flask equipped with stirrer, thermometer and dropping funnel. From the funnel was added with stirring 35.5 grams (0.33 mole) freshly distilled chlorosulfonic acid in increments of about 5 grams each. After all the chlorosulfonic acid had been added, the reaction mixture was brought to reflux temperature (about 80° C.) and refluxed for 15 hours. At the end of the reflux period the reaction mixture was cooled to room temperature, when it divided itself into a crystalline mass and a dark maroon liquid. The crystalline material, after separation, washing with pure ethylene dichloride and drying, weighed 245 grams and was found by infra-red spectroscopy to be MDHA-sulfonic acid, free from MDHA and from MDHA-sulfonyl chloride. This material represented about 75 percent of the theoretical yield of MDHA-SO₃H. The solution phase and washings from the solids, yielded on evaporation a dry product which, after washing with methanol, was found to be a mixture of MDHA-sulfonic acid and MDHA-sulfonyl chloride.

EXAMPLE VIII

Introduction of—SO₃H group (c) Using 30 percent oleum.—A suspension of 2.0 grams of MDHA in 50 grams of the 30 percent oleum of commerce was refluxed at about 125° C. for a half hour under a water-cooled condenser topped with a drying tube containing calcium chloride in order to prevent moisture from entering into the system. The reaction mixture was purplish-black in color due to a complex which forms during the reaction. The MDHA appeared to go largely into solution on heating. At the end of the reflux period the mixture was poured onto an excess of ice. The resultant light-colored suspension was filtered and the separated solids washed with water and dried. The dried product was examined by infra-red sepctroscopy and found to be substantially pure MDHA-sulfonic acid, with the—SO₃H group in the 3-poistion. The acidic aqueous filtrate was found to contain very little MDHA-sulfonic acid or free MDHA, thus indicating essentially total conversion of the MDHA to MDHA-sulfonic acid.

We have also used 65 percent oleum with similar results.

It may be pointed out that the use of liquid sulfur trioxide and of chlorosulfonic acid makes possible the provision of anhydrous systems, thus avoiding the formation of $H_2SO_4$ which must be disposed of later in the process.

EXAMPLE IX

Introduction of sulfonyl chloride group (So₂Cl)

(a) In methylene chloride solvent.—A solution of 50 grams of MDHA in 325 grams of methylene chloride was cooled in an ice bath. To this stirred solution was added dropwise 26.2 grams of chlorosulfonic acid. The violet solution then was heated under reflux for one hour. The solution was poured into an equal volume of ice water. The mixture was stirred and heated to drive off the methylene chloride. The light-colored solid was filtered off, washed with water and dried, giving a quantitative yield of 2-methyl-3-sulfonylchlorodiadduct, the structure of which was confirmed by infra-red spectrophotometric analysis.

Solvents other than methylene chloride may be successfully employed in the chlorosulfonation reaction mixture. Thus, for example, we have used ethylene dichloride under conditions similar to those employed in Example IX, and with similar results. Another solvent we have used satisfactorily is sulfuryl chloride, a typical preparation being described in Example X. It is even possible to carry out the chlorosulfonation without any added solvent, as is described in Example XI.

EXAMPLE X

Introduction of sulfonyl chloride group (b) In sulfuryl chloride solvent.—To a solution of 17.2 grams of MDHA in 85 grams of sulfuryl chloride was added 11.7 grams of chloro-sulfonic acid. The solution was refluxed at 69° C. for 2½ hours, after which the solution was cooled to room temperature and then poured into ice water. The resultant suspension was filtered and the separated solids were dried and examined by infra-red spectroscopy. They were found to be MDHA-sulfonyl chloride, with the sulfonyl group in the 3-position, together with a very small amount of MDHA-sulfonic acid.

EXAMPLE XI

Introduction of sulfonyl chloride group (c) No added solvent.—5.0 grams of MDHA were added incrementally to 90 grams of chlorosulfonic acid in a reaction flask equipped with a mechanical stirrer and protected from contamination by moisture. The MDHA apparently went substantially into solution, forming a dark maroon complex. On stirring at about 25° C. for 5 to 10 minutes, some solid material was observed forming in the flask. After a total reaction time of 15 minutes, the mixture was poured onto ice. The resultant aqueous suspension was filtered, and the separated solids washed with water, and dried. The dried product was examined by infra-red spectroscopy and found to be pure MDHA-sulfonyl chloride, with the $SO_2Cl$ group in the 3-position.

EXAMPLE XII

Introduction of bromine group 344 grams (0.5 mole) of MDHA was added to 950 grams of carbon tetrachloride in a 2-liter, 3-neck reaction flask equipped with stirrer, dropping funnel and reflux condenser. To this mixture were added 1.7 grams of iodine and 0.9 grams of reduced iron powder as bromination catalysts and the whole refluxed with stirring while a solution of 81.0 grams of bromine in 85 grams of carbon tetrachloride was added to the reaction vessel over a period of 2 hours. The total reaction mixture was then refluxed at about 77° C. for 20 hours. At the end of the reflux period the reaction mixture was cooled to room temperature, when a crystalline precipitate was formed. This was filtered off, digested with dilute hydrochloric acid to remove iron and iron salts, then again filtered off, dried and weighed; 87 grams of 2-methyl-3-bromo-DHA was obtained in this fraction. The original carbon tetrachloride filtrate was added to an excess of water, and the carbon tetrachloride boiled from the aqueous suspension. The resultant suspension was filtered, and the separated solids dried and weighed. The weight of 2-methyl-3-bromo-DHA obtained from this fraction (the identity of the product being established, as before, by infra-red spectroscopy) was 285 grams, giving a total yield of 372 grams, or about 97 percent of the theoretical.

EXAMPLE XIII

Introduction of iodine group

A mixture of 344 grams (0.5 mole) of MDHA with 900 grams of methylene chloride was placed in a 2-liter resin kettle fitted with stirrer and reflux condenser. To this mixture was added 66.7 grams (0.26 mole) iodine; then 95 grams of white fuming (99 percent) nitric acid was added gradually, with vigorous stirring. The resultant solution was 2 Molar in nitric acid. The reaction mixture was refluxed at about 50° C. for 5 hours, at the end of which time 60.0 grams more of 99 percent nitric acid were added, resulting in a solution 3 Molar in nitric acid. This reaction mixture was refluxed for an additional period of 3 hours, then the major portion of the methylene chloride and nitric acid distilled off. The residue after distillation was washed with an aqueous solution of sodium bisulfite to remove any residual iodine, then with water, and finally boiled as an aqueous suspension to remove the last portions of methylene chloride. The resultant suspension was filtered and the filter-cake dried. The weight of the dried product, identified by infra-red spectroscopy to be 2-methyl-3-iodo-DHA, was 387 grams, corresponding to about 95 percent of the theoretical yield.

EXAMPLE XIV

Introduction of nitro group

A solution of 2.40 grams of MDHA in a mixture of 30 grams of 98 percent white fuming nitric acid and 52 grams of methylene chloride was allowed to stand at room temperature for 30 minutes. The solution was then diluted with excess water, and the organic phase separated. Evaporation of the solvent left the 3-nitro-2-methyl-DHA, the struce being confirmed by infra-red spectrophotometric analysis.

EXAMPLE XV

Introduction of nitro group

It was observed earlier in this specification that, while substitution in the 3-position can be effected either before or after oxidation of the 2-methyl group to the carboxy group, we have found it generally preferable from a practical standpoint to accomplish the substitution prior to such oxidation due to the deactivating effect of the carboxy group and resultant effect on reaction conditions, specificity of reaction, and yield and purity of product. One outstanding exception to this general situation, in that the reaction may be effected readily, at least as far as specificity of isomer is concerned, is the introduction of a nitro group after oxidation of the 2-methyl group; but even here, as will be noted, the conditions found necessary for nitration are considerably more drastic than in the preceding example where nitration took place before oxidation of the 2-methyl group:

To 150 grams of white fuming (98 percent) nitric acid was added 40 grams of powdered 2-carboxy-DHA. The mixture was heated to reflux temperature (about 90° C.), with stirring, and allowed to reflux for 10 minutes. It was then cooled to room temperature, then filtered, and the filter-cake washed with water and dried. The product was shown by infra-red spectrophotometric analysis to be 2-carboxy-3-nitro-DHA. The weight of dried product was 42 grams, corresponding to about 99 percent of the theoretical yield.

Pyrolysis of the disubstituted diadduct

Pyrolytic cracking of the 2,3-disubstituted diadduct may be carried out in the wiped-film molecular type still mentioned by Look in the co-pending application previously referred to or, in many cases of the disubstituted diadducts of the present invention, in conventional distillation apparatus, particularly when reduced pressures are employed.

The pyrolytic cracking step may be effected either before or after oxidation of the 2-methyl group, but we have found cracking before oxidation to be generally preferable. Typical procedures of this kind are described in Examples XVI to XVIII given below.

EXAMPLE XVI

Pyrolytic cracking of 2-methyl-3-sulfonyl chloride DHA

To a single-neck 200 ml. round-bottom flask was added 35.0 grams of pure, finely powdered MDHA-sulfonyl chloride prepared according to the procedure described in Example XI, XII or XIII, and this reaction flask was fitted with a short path adapter leading to a receiving flask. The receiving flask was cooled by partial immersion in a dry-ice-isopropyl alcohol bath, and had provision for application of vacuum. A nitrate salt bath was used to raise the temperature of the reaction flask to about 210° C., at which point the MDHA-sulfonyl chloride was melted. A vaccum was applied to the system until the pressure was about 10 mm. Hg. Heating of the reaction flask was continued till a temperature of 250° C. was reached, whereupon the MDHA-sulfonyl chloride began decomposing at a perceptible rate, giving off vapors which were collected and condensed in the receiving flask. The pyrolysis was continued for about 30 minutes, after which the reaction flask was allowed to cool to room temperature, and air then allowed to enter the system slowly. The apparatus was then disassembled, and the reaction flask residue washed with chloroform through a filter funnel. The coke-like residue weighed 0.53 grams, or about 1.5 percent of the original charge. The chloroform-soluble portion, after evaporation of the solvent, was found to be unpyrolyzed material, weighing 2.1 grams or about 6.0 percent of the charge. The distillate collected in the receiving flask and neck was subjected to vacuum distillation, using a pressure of less than 1 mm. Hg and temperatures up to 100° C. Most of the hexachlorocyclopentadiene was recovered in this way. The distillation residue was washed with petroleum ether and dried, yielding 9.2 grams of pure 2-methyl-3-naphthalene sulfonyl chloride, corresponding to 86 percent of the theoretical, and to 26.3 percent of the original charge. Its identity was established by infra-red spectroscopy. The portions of hexachlorocyclopentadiene recovered in the vacuum distillation and from the petroleum ether and chloroform washings were combined, to give 23.3 grams total hexachlorocyclopentadiene, representing a recovery of 95.5 percent or 66.3 percent by weight of the charge. The entire weight recovery was therefore about 100.1 percent of the weight of material charged to the reactor.

EXAMPLE XVII

Pyrolytic cracking of 2-methyl-3-nitro DHA

A slurry of 1 part by weight of 2-methyl-3-nitro-diadduct, as prepared in Example XIV, in 2 parts by weight of hexachlorocyclopentadiene was thermally decomposed at 350° C. to 400° C. in a wiped-film molecular type still. The products resulting from the pyrolysis were removed by vacuum distillation. Recrystallization of the distillate from hexane gave 3-nitro-2-methylnaphthalene melting at 119° C. to 121° C. (Fisher-Johns apparatus), compared with the 117° C. to 118° C. reported in the literature. The structure of the compound was confirmed by oxidation and reduction to the better known 3-amino-2-naphthoic acid.

EXAMPLE XVIII

Pyrolytic cracking of 2-carboxy-DHA-3-sulfonic acid anhydride (a) Preparation of 2-carboxy-DHA-3-sulfonic acid anhydride.—As note dearlier in this specification, when the 3-position of MDHA is occupied by an —SO₃H group, pyrolysis of the di-substituted diadduct usually results in considerable decomposition and poor yield, and that this may be avoided by having the sulfo group in the 3-position a sulfonyl chloride group or by combining it with a carboxy group in the 2-position to form a mixed sulfonic-carboxylic anhydride which will volatilize to the corresponding naphthalene when the thus-substituted diadduct is pyrolyzed.

We have found that 2-carboxy-DHA-3-sulfonic acid anhydride may conveniently be prepared by dehydration of 2-carboxy-DHA-3-sulfonic acid with sulfur trioxides, fuming sulfuric acid, phosphorus pentoxide, thionyl chloride or similar dehydrating agents. Thus, for example, 20.0 grams of 2-carboxy-DHA-3-sulfonic acid prepared according to the procedure of Example III were added to 200 grams of 30 percent oleum (that is, fuming sulfuric acid containing 30 percent excess sulfur trioxide) and the mixture refluxed at about 125° C. for one hour. The mixture was then cooled to room temperature and then poured carefully onto an excess of ice. The resultant aqueous acid suspension was filtered, the filtered-off solids washed with water and dried. The dried product was shown by infra-red spectroscopy to be substantially pure 2-carboxy-DHA-3-sulfonic acid anhydride. The weight of the recovered dried product was 15.5 grams, corresponding to a yield of about 80 percent of theoretical.

(b) Pyrolytic cracking.—5.0 grams of the 2-carboxy-DHA-3-sulfonic acid anhydride prepared as above were pyrolyzed by the general procedure described in Example XVI for 2-methyl-DHA-3-sulfonyl chloride, using, however, a cracking temperature of 280 to 300° C. and a pressure of 5 mm. Hg. The distillate collected was found to consist primarily of 2-carboxy-3-naphthalene-sulfonic acid anhydride and hexachlorocyclopentadiene, with a small portion of entrained unreacted 2-carboxy-DHA-3-sulfonic acid anhydride. This mixture was treated with cold pentane to dissolve the hexachlorocyclopentadiene. The pentane-insoluble product was filtered off and dried. The dried product was a gray powder and was shown by infra-red sepctroscopy to be substantially pure 2-carboxy-3-naphthalene sulfonic anhydride having the structural formula:

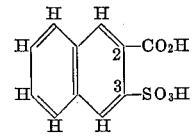

Replacement of substituent group in 3-position with an hydroxy group

As has been stated in the foregoing discussion, the substituent group in the 3-position may be replaced by an hydroxy group either before or after pyrolytic cracking, that is, either in the di-substituted diadduct or in the di-substituted naphthalene resulting from pyrolysis. A typical instance in the latter category is given in Example XIX and one in the former in Example XX.

EXAMPLE XIX

Replacement of substituent group in 3-position with hydroxy group after pyrolysis A mixture of 10.0 grams of 2-carboxy-3-naphthalene sulfonic acid anhydride prepared according to the procedure of Example XVII(a), 100 grams of potassium hydroxide, and 300 parts of water were heated in a nickel-lined autoclave at 260° C. and autogenous pressure (about 300 pounds p.s.i.g.) for 6 hours. The autoclave was allowed to cool to about room temperature, then opened, and the yellow reaction mixture poured into a glass vessel where it was acidified carefully with 6 Normal hydrochloric acid to a pH of less than about 3, then digested for about 10 minutes to agglomerate the precipitated 3-hydroxy-2-naphthoic acid (BON acid). On filtering off, washing with water, and drying this precipitate, a light-yellow solid product weighing 5.4 grams was obtained. When the filtrate was cooled with ice, some further precipitate was formed. This was recovered, yielding an additional 0.8 gram BON acid, mak-

EXAMPLE XX

Replacement of substituent group in 3-position with hydroxy group before pyrolysis As indicated earlier in this specification, one convenient route for replacing a nitro group in the 3-position with an hydroxy group is the reduction of the nitro group to an amino group, followed by diazotization and boiling. Thus, for example, a mixture of 10.2 grams of 2-methyl-3-nitro-DHA in 200 grams of isopropyl alcohol was heated to boiling, and 18 grams of concentrated (38 percent) hydrochloric acid was added while boiling was continued. 11.3 grams of stannous chloride dihydrate were now added to the suspension, causing an immediate darkening of the mixture. After boiling 5 minutes more, the mixture was evaporated to one-fourth its original volume and then added to an excess of water. The grey precipitate obtained was washed with water and dried, yielding 9.8 grams of 2-methyl-3-amino-DHA. This material was suspended in 450 grams of water and 50 grams of concentrated (96 percent) sulfuric acid added. The suspension was chilled to 0–5° C. and a solution of 2.0 grams of sodium nitrate in 10 grams of water added slowly, with stirring. The resultant mixture was boiled for 10 minutes, when a yellow coloration of the mixture was observed. The reaction mixture was then diluted with an excess of water and filtered. The separated solid was 2-methyl-3-hydroxy-DHA in essentially quantitative yield. It was identified by infra-red spectroscopy, and by pyrolytic cracking to produce the known 2-methyl-3-naphthol.

As was stated earlier in this specification, the several steps involved in the preparation of BON acid by the process of our invention may be carried out in any desired sequence, with the obvious exception that (1) the pyrolytic cracking step is not performed prior to the introduction of the substituents group into the 3-position, and (2) the step of replacing the substituent group in the 3-position cannot be effected prior to the introduction of that group. The examples given below illustrate the wide latitude possible in the selection of operable sequences, it being understood, however, that the selection is not limited to these sequences.

EXAMPLE XXI

MDHA was converted to MDHA sulfonic acid by introducing the —$SO_3H$ group into the 3-position by treatment with liquid sulfur trioxide by the procedure of Example VI. The 2-methyl group in the MDHA-sulfonic acid was oxidized by treatment with nitric acid to the carboxy group in accordance with the procedure described in Example III, the product being 2-carboxy-DHA-3-sulfonic acid. This, in turn, was dehydrated with 30 percent oleum, as described in Example XVIII(a), yielding 2-carboxy-DHA-3-sulfonic acid anhydride. The washed, dried anhydride was pyrolyzed in the manner of Example XVIII(b) to yield 2-carboxy-3-naphthalene sulfonic anhydride. This compound was subjected to treatment with aqueous potassium hydroxide solution at elevated temperature and pressure, as described in Example XIX, yielding the solution of the potassium salt of BON acid. This solution was acidified with hydrochloric acid, resulting in a precipitate of free BON acid which was separated and recovered.

EXAMPLE XXII

The sulfonyl chloride group was introduced into the 3-position of MDHA by treating a methylene chloride solution of MDHA with chloro-sulfonic acid as described in Example IX. The product was pyrolytically cracked according to the procedure of Example XVI to yield 2-methylnaphthalene-3-sulfonyl chloride. This compound was boiled in water to produce an aqueous solution of 2-methyl-naphthalene-3-sulfonic acid. The methyl group of this compound was oxidized to the carboxy group by catalyzed treatment of the aqueous solution with oxygen under pressure, as described in Example V, obtaining as a result an aqueous solution of 2-carboxynaphthalene-3-sulfonic acid. To this solution was added potassium hydroxide, and the solution then autoclaved according to the procedure of Example XIX, resulting in a solution of the potassium salt of BON acid. This solution was acidified with hydrochloric acid, precipitating the free BON acid, which was separated and recovered.

EXAMPLE XXIII

In this example a nitro group was introduced into the 3-position of the naphthalene moiety of the MDHA, followed in sequence by oxidation of the 2-methyl group to a carboxy group, reduction of the nitro to an amino group, and replacement of the amino group with an hydroxyl group: MDHA was nitrated with white fuming nitric acid in methylene chloride solution as described in Example XIV, yielding 2-methyl-3-nitro-DHA. This compound was oxidized with acid potassium permanganate, using acetone as a co-solvent, to yield 2-carboxy-3-nitro-DHA. The 3-nitro group in this compound was reduced with stannous chloride, according to the procedure described in Example XX, giving 2-carboxy-3-amino-DHA. This in turn was diazotized with nitrous acid and the diazonium compound hydrolyzed, also according to the procedure of Example XX, to obtain 2-carboxy-3-hydroxy-DHA. This compound was pyrolyzed in the manner of Example XVII, leading directly to the formation of 3-hydroxy-2-naphthoic acid (BON acid) in admixture with hexachlorocyclopentadiene, from which it was separated by extraction with aqueous sodium carbonate solution. The resulting aqueous solution of the sodium salt of BON acid was acidified with hydrochloric acid, precipitating free BON acid which was separated and recovered.

EXAMPLE XXIV

In this example a sulfonyl chloride group was introduced in the 3-position of the naphthalene moiety of the MDHA, followed in sequence by pyrolytic cracking, replacement of the sulfonyl chloride group with an hydroxy group, and oxidation of the 2-methyl group to a carboxy group: MDHA was treated with chlorosulfonic acid according to the procedure of Example IX, to give 2-methyl-DHA-3-sulfonyl chloride. This compound was pyrolytically cracked according to the procedure described in Example XVI, yielding 2-methylnaphthalene-3-sulfonyl chloride. This compound in turn was treated in an autoclave with 25 percent aqueous potassium hydroxide at 250° C. and about 300 lbs. pressure, yielding 2-methyl-3-naphthol, which, on oxidation in aqueous suspension, with oxygen and HBr catalyst as described in Example IV, yielded 3-hydroxy-2-naphthoic acid.

EXAMPLE XXV

In this example a nitro group was introduced into the 3-position of the naphthalene moiety of the MDHA, followed in sequence by reduction of the nitro group to an amino group, replacement of the amino group by an hydroxy group, and oxidation of the 2-methyl group to a carboxy group and pyrolysis: MDHA was nitrated according to the procedure of Example XIV to obtain 2-methyl-3-nitro-DHA. The nitro group of this compound was reduced with stannous chloride to an amino group according to the procedure of Example XX, yielding 2-methyl-3-amino-DHA. This compound was diazotized, according to the procedure of Example XX, with nitrous acid and sulfuric acid and then boiled in dilute sulfuric acid, yielding 2-methyl-3-hydroxy-DHA. This compound was oxidized with potasium permanganate in aqueous acetone to 2-carboxy-3-hydroxy-DHA, which was pyrolytically cracked, yielding hexachlorocyclopentadiene and 3-hydroxy-2-naphthoic acid. The latter was separated and recovered according to the procedure of Example XXIII.

EXAMPLE XXVI

In this example a nitro group was introduced into the 3-position of the naphthalene moiety of the MDHA, followed in sequence by replacement of the nitro group with an hydroxy group, pyrolysis, and oxidation of the 2-methyl group to an hydroxy group: MDHA was nitrated according to the procedure of Example XIV to produce 2-methyl-3-nitro-DHA. This was converted to 2-methyl-3-hydroxy-DHA by reduction followed by diazotization as described in Example XXV above. Pyrolytic cracking of this intermediate yielded a mixture of 2-methyl - 3 - naphthol and hexachlorocyclopentadiene which was separated into its components by fractional distillation under high vacuum. The pure 2 - methyl-3-naphthol was oxidized with gaseous oxygen under pressure, using HBr as a catalyst, employing the procedure described in Example IV, to obtain 3-hydroxy-2-naphthoic acid, which was separated and recovered.

EXAMPLE XXVII

In this example the 2-methyl group in the naphthalene moiety of the MDHA was oxidized to the carboxy group, followed in sequence by introduction of a nitro group in the 3-position, reduction, replacement of the amino group with an hydroxy group, and pyrolytic cracking: MDHA was oxidized with nitric acid in the manner of Example II to yield 2-carboxy-DHA, which was nitrated with white fuming (98 percent) nitric acid according to the procedure of Example XV to obtain 2-carboxy-3-nitro-DHA. The nitro group in this compound was reduced in aqueous hydrochloric acid with stannous chloride, yielding 2-carboxy - 3 - amino-DHA which was diazotized with nitrous acid in concentrated sulfuric acid then hydrolyzed in 50 percent sulfuric acid to obtain 2-carboxy-3-hydroxy-DHA. This product was pyrolytically cracked according to the procedure of Example XVIII, yielding a mixture of hexachlorocyclopentadiene and 3-hydroxy-2-naphthoic acid. The latter was extracted with an aqueous solution of sodium carbonate in the form of the sodium salt. Acidification of this solution with hydrochloric acid precipitated free BON acid which was separated and recovered.

EXAMPLE XXVIII

In this example the 2-methyl group in the naphthalene moiety of the MDHA has oxidized to the carboxy group, followed in sequence by nitration, pyrolytic cracking, reduction, and replacement of the amino group with an hydroxy group: MDHA was oxidized with nitric acid in the manner of Example II, yiedling 2-carboxy-DHA. This compound was then nitrated according to the procedure of Example XV to produce 2-carboxy-3-nitro-DHA, which was then pyrolytically cracked according to the procedure of Example XVIII to yield hexachlorocyclopentadiene and 2-carboxy-3-nitronaphthalene. The latter was extracted from the mixture with an aqueous sodium carbonate solution, from which it was precipitated by addition of hydrochloric acid to a pH less than about 3. The separated 2-carboxy-3-nitronaphthalene was reduced in methanol solution by the action of hydrogen gas and a supported platinum catalyst, yielding 2-carboxy-3-aminonaphthalene, which on treatment with 40 percent aquoeus sodium bisulfite solutions at 150–155° C. yielded the sodium salt of 3-hydroxy-2-naphtholic acid in aqeuous solution. Acidification of this solution with hydrochloric acid to a pH of less than about 3 precipitated the free BON acid which was separated and recovered.

EXAMPLE XXIX

In this example a halogen (bromine) was introduced into the 3-position of the naphthalene moiety of the MDHA, followed in sequence by oxidation of the 2-methyl group, replacement of the bromo group with an hydroxy group, and pyrolysis: MDHA was brominated in carbon tetrachloride solution according to the procedure of Example XII, yielding 2-methyl-3-bromo-DHA. This compound was oxidized in refluxing concentrated nitric acid in the manner of Example III to yield 2-carboxy-3-bromo-DHA, which was then treated with sodium nitrite in dimethyl sulfoxide solution at 200° C. to yield on dilution with water 2-carboxy-3-hydroxy-DHA. This was pyrolyzed according to the procedure of Example XVIII to yield a mixture of hexachlorocyclopentadiene and 3-hydroxy-2-naphthoic acid. The latter was extracted from the mixture with an aqueous solution of sodium carbonate in the form of the sodium salt. Acidification of this solution with hydrochloric acid to a pH less than about 3 precipitated the free BON acid which was separated and recovered.

In addition to the novel process for preparing BON acid which constitutes a principal object of our invention, it is evident that many new and useful compositions of matter are produced in the course of this process. The compounds thus produced may be described generically as 2,3-di-substituted derivatives of naphthalene or of DHA (that is, the Diels-Alder adduct of 2 molecules of hexachlorocyclopentadiene and one molecule of naphthalene) in which the 2-position of the naphthalene or naphthalene moiety of the DHA is occupied by either a methyl or carboxy group and the 3-position occupied by a sulfonic acid, sulfonyl chloride, nitro, amino, chloro, bromo or iodo groups. The most important of these compounds are listed below. To the best of our knowledge they have never been reported hitherto, nor do we know of any method other than that of our invention by which they might be synthesized commercially:

Derivatives of naphthalene 2-methyl-3-naphthalene sulfonic acid
2-methyl-3-naphthalene sulfonyl chloride
2-methyl-3-bromo-naphthalene
2-methyl-3-iodo-naphthalene
2-carboxy-3-naphthalene sulfonic anhydride

Derivatives of MDHA 2-methyl-3-hydroxy-DHA
2-methyl-3-sulfonic acid-DHA
2-methyl-3-sulfonyl chloride-DHA
2-methyl-3-bromo-DHA
2-methyl-3-iodo-DHA
2-carboxy-3-nitro-DHA
2-carboxy-3-bromo-DHA
2-carboxy-3-sulfonic acid-DHA
2-carboxy-3-sulfonic anhydride-DHA
2-carboxy-3-hydroxy-DHA
2-carboxy-3-iodo-DHA The structural formulas of all the above compounds were established by infra-red sepctroscopy, and confirmed by elemental analysis and molecular weight determinations, and, when feasible, by appropriate chemical reactions.

All the naphthalene derivatives listed above are clearly useful as intermediates in the manufacture of BON acid; they find a place also in the manufacture of other dyestuff chemicals and plasticizers, and as intermediates in the preparation of pharmacologically active compounds.

The derivatives of MDHA possess a variety of useful properties in addition to their obvious utility as intermediates to BON acid. Thus, for example, the 2-methyl derivatives will serve as flame-retardant plasticizers and as ovacides when the group in the 3-position is bromine, iodine, chlorine, or sulfonyl chloride. The 2-methyl-3-hydroxy-DHA shows antioxidant activity and can be used in rubber compounding; and the 2-methyl-3-sulfonic acid will stabilize organic-aqueous emulsions.

The 2-carboxy derivatives of MDHA listed above are all, of course, intermediates in the manufacture of BON acid. In addition, when the group in the 3-position is a nitro-, bromo, chloro, iodo or hydrogen group, the compound will function as a plant growth regulator. When the 3-position is occupied by a sulfonic acid group, the compound is an antiviral agent, besides being an intermediate to the mixed anhydride which is valuable as a stable flame-retardant plasticizer and detonation moderator.

From the foregoing discussion and examples it will be evident that many modifications in the processes and products of our invention will naturally suggest themselves to one skilled in the chemical arts involved. Thus, for example, other alkalis, such as sodium hydroxide, may be employed instead of potassium hydroxide in replacing the substituent group in the 3-position with an hydroxyl group. Again, air may be used instead of oxygen for oxidizing the 2-methyl group to a carboxyl group, the pressure when using air being increased sufficiently to supply the amount of oxygen required. Other reducing agents, other oxidizing agents, other solvents, and variations in procedural details, all known to a skilled organic chemist, may be utilized. All such modifications in process and product are considered to be comprehended within the scope of the invention as defined in the claims.

It is to be understood that we consider that the processes herein described and/or claimed, and the equivalents thereof, for forming or obtaining the above-listed "Derivatives of Naphthalene" and "Derivatives of MDHA" (i.e. intermediates in the herein described and/or claimed production of BON acid) are considered to be patentably novel and to be part of the present invention or inventions.

We claim:
1. A di-substituted Diels-Alder adduct of two molecules of hexachlorocyclopentadiene and one molecule of naphthalene having the structural formula:

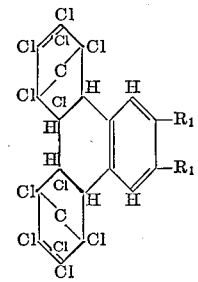

wherein $R_1$ is the carboxylic portion of a carboxylic-sulfonic anhydride group and $R_2$ is the sulfonic portion of a carboxylic-sulfonic anhydride group joined to the carboxylic portion $R_1$ in a heterocyclic ring formation.

References Cited
UNITED STATES PATENTS

| | | | |
|---|---|---|---|
| 2,658,913 | 11/1953 | Hyman et al. | 260—543 |
| 1,623,678 | 4/1927 | Herz et al. | 260—327 |
| 1,760,328 | 5/1930 | Twiss | 260—507 |
| 3,177,246 | 4/1965 | Look | 260—507 |

OTHER REFERENCES

Kaufman et al.: Berichte der Deutsch, Chem. Gesel., vol. 55 (1922), pp. 1499–1508.

JAMES A. PATTEN, Primary Examiner

U.S. Cl. X.R.

252—404; 260—520, 649, 646, 505, 507, 543, 545, 524, 515, 645, 518, 570, 192, 621, 619, 650